(12) United States Patent
Dong et al.

(10) Patent No.: US 11,084,118 B2
(45) Date of Patent: Aug. 10, 2021

(54) METHOD AND SYSTEM OF ALL-POSITION PLASMA WELDING PROCESS FOR TITANIUM ALLOY PIPELINE

(71) Applicant: Guangdong Welding Institute (China-Ukraine E.O. Paton Institute of Welding), Guangdong (CN)

(72) Inventors: Chunlin Dong, Guangdong (CN); Chunfu Guo, Guangdong (CN); Dan Liu, Guangdong (CN); Weiqiang Sun, Guangdong (CN); Boyan Liu, Guangdong (CN); Yaoyong Yi, Guangdong (CN); Shida Zheng, Guangdong (CN); Jianglong Yi, Guangdong (CN); Su Li, Guangdong (CN); Ben Niu, Guangdong (CN); Yanggui Xin, Guangdong (CN); Xianghui Ren, Guangdong (CN)

(73) Assignee: GUANGDONG WELDING INSTITUTE (CHINA-UKRAINE E.O. PATON INSTITUTE OF WELDING), Guangdong (CN)

( * ) Notice: Subject to any disclaimer, the term of this patent is extended or adjusted under 35 U.S.C. 154(b) by 332 days.

(21) Appl. No.: 16/215,522

(22) Filed: Dec. 10, 2018

(65) Prior Publication Data

US 2019/0184485 A1 Jun. 20, 2019

(30) Foreign Application Priority Data

Dec. 15, 2017 (CN) .......................... 201711373523.0

(51) Int. Cl.
*B23K 10/00* (2006.01)
*B23K 10/02* (2006.01)
(Continued)

(52) U.S. Cl.
CPC .............. *B23K 10/02* (2013.01); *B23K 37/00* (2013.01); *B23K 37/0217* (2013.01);
(Continued)

(58) Field of Classification Search
CPC .... B23K 10/02; B23K 37/00; B23K 37/0217; B23K 37/0276; B23K 37/053;
(Continued)

(56) References Cited

U.S. PATENT DOCUMENTS 2,910,572 A * 10/1959 Diehl ..................... B23K 9/167
219/60 R
6,729,529 B2 * 5/2004 Cecil .................. B23K 37/0533
228/44.5

(Continued)

*Primary Examiner* — Mark H Paschall
(74) *Attorney, Agent, or Firm* — Loza & Loza, LLP; Julio M. Loza

(57) ABSTRACT

The present disclosure provides a method of all-position plasma welding process for titanium alloy pipeline, which may be used for welding a titanium alloy pipeline made of TA2 or TC4, with a wall thickness of 3~16 mm, and a pipe diameter of 108 mm or more. When the wall thickness is 3~9 mm, a keyhole type technology may be used for one-time welding formation, and when the wall thickness is 9~16 mm, grooving treatment needs to be performed for the pipeline, and the keyhole type technology is used for backing welding, and then filling welding and covering welding are performed using filler wire welding through a melt-in technology. The method includes following steps: S1: performing pre-welding treatment for the pipeline; S2: clamping the pipeline; S3: setting welding parameters; S4: starting the welding.

19 Claims, 6 Drawing Sheets

(51) Int. Cl.
*B23K 37/053* (2006.01)
*B23K 37/00* (2006.01)
*B23K 37/02* (2006.01)
B23K 103/14 (2006.01)
B23K 101/10 (2006.01)

(52) U.S. Cl.
CPC ........ *B23K 37/0276* (2013.01); *B23K 37/053* (2013.01); *B23K 37/0282* (2013.01); *B23K 2101/10* (2018.08); *B23K 2103/14* (2018.08)

(58) Field of Classification Search
CPC .............. B23K 2101/10; B23K 103/14; B23K 37/0282; H05H 1/26; H05H 1/36
USPC ............. 219/121.46, 121.45, 121.48, 121.59
See application file for complete search history.

(56) References Cited

U.S. PATENT DOCUMENTS

| | | | |
|---|---|---|---|
| 6,875,949 B2 * | 4/2005 | Hall .................... | B23K 35/3053 219/121.64 |
| 6,880,220 B2 * | 4/2005 | Gandy ................. | B23K 9/0253 29/407.01 |
| 9,061,374 B2 * | 6/2015 | Hamada ............... | B23K 26/123 |

* cited by examiner

METHOD AND SYSTEM OF ALL-POSITION PLASMA WELDING PROCESS FOR TITANIUM ALLOY PIPELINE

CLAIM OF PRIORITY UNDER 35 U.S.C. § 119

The present disclosure claims the priority to the Chinese Patent Application with the filing No. CN201711373523.0, filed on Dec. 15, 2017 with Chinese Patent Office and entitled "All-position Plasma Welding Process Method for Titanium Alloy Pipeline", the contents of which are incorporated herein by reference in their entirety.

TECHNICAL FIELD

The present disclosure relates to the field of welding, and particularly to a method and system of all-position plasma welding process for titanium alloy pipeline.

BACKGROUND

In a procedure of titanium alloy pipeline welding, a method of argon tungsten-arc welding is mainly used at present. During the welding of titanium alloy pipelines with a high thickness or a medium thickness, a type of narrow gap welding may be required for the argon tungsten-arc welding. A U-shape groove is required for a grooving type, thus increasing time of the welding procedure, lowering the production efficiency, and increasing to high production costs.

SUMMARY

An aspect of the present disclosure is to provide a method of all-position plasma welding process for titanium alloy pipeline, so as to solve the problem of high production costs and low production efficiency of the existing welding methods.

Another aspect of the present disclosure is to provide a welding system, which welding system is matched with the above method of all-position plasma welding process for titanium alloy pipeline, so as to achieve all-position plasma welding for the titanium alloy pipelines.

Embodiments of the present disclosure may be achieved through following implementations.

The present disclosure provides a method of all-position plasma welding process for titanium alloy pipeline, for welding a titanium alloy pipeline made of:

TA2 or TC4 materials, with a wall thickness of 9 mm to 16 mm, and a pipe diameter of 108 mm or more, including following steps:
    S1: performing pre-welding treatment for the pipeline, and performing grooving treatment for the pipeline;
    S2: clamping the pipeline;
    S3: setting welding parameters;
    S4: starting the welding.

On the basis of the above aspects, the present disclosure further provides a method of all-position plasma welding process for titanium alloy pipeline, for welding a titanium alloy pipeline made of TA2 or TC4 materials, with a wall thickness of 3 mm to 9 mm, and a pipe diameter of 108 mm or more, including following steps:
    S1: performing pre-welding treatment for the pipeline;
    S2: clamping the pipeline;
    S3: setting welding parameters;
    S4: starting the welding.

Optionally, the pre-welding treatment includes polishing, cleaning, and scrubbing, a polished axial length is 30 mm to 50 mm, and end openings of the pipeline also need to be polished, and then the polished parts are cleaned, and the cleaned pipeline is scrubbed with acetone.

Optionally, the polishing should be performed until the pipeline shows metallic luster.

Optionally, the welding parameters may include:
parameters of an endoscopic back forming protection system: setting a rotation speed and a gas protection flow rate of an endoscopic gas protection device, wherein the endoscopic gas protection device moves synchronously with a plasma welding gun during the welding, and performs gas protection to formation of a back face of a weld;
parameters of a welding gun swinging device: setting parameters of a swing angle of the welding gun, such that an angle between the welding gun and a tangent plane of the pipeline may be changed as required at any time during the welding;
parameters of an electric arc AVC tracking system: setting parameters for feeding back and adjusting an electric arc height in the welding process, for keeping the electric arc stable;
a welding protection dragging shield: setting a protection gas flow rate inside the dragging shield, then a welding joint in a high-temperature state may be protected in the welding process;
a wire feeding device: setting wire feeding parameters of an independent wire feeding mechanism, then welding in two modes, namely, a mode with filler wire and a mode without filler wire, may be realized in the welding process;
a swinging amplitude of the electric arc: setting a swinging angle of the electric arc, so as to enable a liquid metal to expand in a uniform manner in a process of filler wire welding, fill a whole welded junction, to form completed weld.

Optionally, during installation of the pipeline, a distance b between two pipelines to be welded is less than 0.5 mm.

Optionally, the method of all-position plasma welding process for titanium alloy pipeline includes backing welding, filling welding, and covering welding.

The backing welding or keyhole type technology includes 12 sections (a welding starting position is set as 0°), with the 12 sections being respectively as follows:
a set range of a first section is: 0°~30°;
a set range of a second section is: 2°~50°;
a set range of a third section is: 20°~70°;
a set range of a fourth section is: 40°~150°;
a set range of a fifth section is: 60°~210°;
a set range of a sixth section is: 90°~310°;
a set range of a seventh section is: 100°~345°;
a set range of an eighth section is: 120°~370°;
a set range of a ninth section is: 150°~370°;
a set range of a tenth section is: 180°~370°;
a set range of an eleventh section is: 270°~370°;
a set range of a twelfth section is: 300°~370°.

The filling welding and the covering welding include 6 sections (a welding starting position is set as 0°), with the 6 sections being respectively as follows:
a set range of a first section is: 0°~50°;
a set range of a second section is: 30°~130°;
a set range of a third section is: 90°~190°;
a set range of a fourth section is: 120°~280°;
a set range of a fifth section is: 150°~310°;
a set range of a sixth section is: 180°~370°.

Before the welding is started, a welding manner and a welding section are selected according to physical properties and electric arc properties of a material of the pipeline.

Optionally, parameters that need to be set for the backing welding or the keyhole type technology include a welding starting position, an inclination angle of the welding gun, a pulse background (basic) current, a peak current, a smoothing current, a pulse frequency, an ion gas flow rate, a duty cycle, a protection gas flow rate, a dragging shield gas flow rate, a back protection gas flow rate, and a welding speed, wherein the welding starting position is $|\alpha|<90°$, the inclination angle of the welding gun is $|\beta|<15°$; the pulse background current is 40~210 A, the peak current is 150~420 A, the smoothing current is 135~420 A, the pulse frequency is 1~100 Hz, the ion gas flow rate is 1~10 L/min, the duty cycle is 10~90%, the protection gas flow rate is 10~35 L/min, the dragging shield gas flow rate is 25~95 L/min, the back protection gas flow rate is 25~85 L/min, and the welding speed is 70~300 mm/min.

Optionally, parameters that need to be set for the filling welding and the covering welding include a welding starting position, an inclination angle of the welding gun, a filler wire position, a pulse background current, a peak current, a smoothing current, a pulse frequency, a protection gas flow rate, a duty cycle, an ion gas flow rate, a dragging shield gas flow rate, a back protection gas flow rate, a wire feeding speed, a diameter of a welding wire, a swinging amplitude of the welding gun, and a welding speed, wherein the welding starting position is $|\alpha|<90°$, the inclination angle of the welding gun is $|\beta|<15°$, the filler wire position is $45°<|\gamma|<75°$, the pulse background current is 40~110 A, the peak current is 80~420 A, the smoothing current is 135~420 A, the pulse frequency is 1~100 Hz, the protection gas flow rate is 1~25 L/min, the duty cycle is 10~90%, the ion gas flow rate is 1~10 L/min, the dragging shield gas flow rate is 25~95 L/min, the back protection gas flow rate is 10~35 L/min, the wire feeding speed is 0~4000 mm/min, the diameter of the welding wire is 0.8~1.4 mm, the swinging amplitude of the welding gun is −25 mm~+25 mm, and the welding speed is 70~300 mm/min.

Optionally, the method of all-position plasma welding process for titanium alloy pipeline further includes a preliminary experiment, and the preliminary experiment is used to measure a lowest keyhole voltage of a keyhole type plasma arc.

A welding system uses the above method of all-position plasma welding process for titanium alloy pipeline to obtain a titanium alloy pipeline product. The welding system may include a welding tractor system, a gas protection device, and a clamping device for fixing a pipeline. The clamping device may include an annular rack, a fastening structure, and two tracks each in a semi-circular shape, the two tracks are assembled to form an annular shape, the annular rack is mounted to the tracks, the fastening structure is mounted to inner sides of the tracks. The welding tractor system may be mounted to the annular rack, and the welding tractor system may rotate along the annular rack. The gas protection device may be fixedly connected to the welding tractor system. After the pre-welding treatment of grooving and so on is performed to the pipeline that needs to be welded, the pipeline is connected to the welding tractor system through the clamping device. The welding tractor system completes the welding according to the preset welding parameters.

Optionally, the welding tractor system includes a trolley, a plasma gun, and a wire feeding mechanism, the trolley is mounted to the annular rack, the trolley is in sliding connection to the annular rack, the trolley moves relative to the annular rack around a shaft axis of the annular rack, the plasma gun and the wire feeding mechanism are respectively mounted to the trolley, the plasma gun and the wire feeding mechanism are provided at an interval, and an output end of the wire feeding mechanism is oriented towards an output end of the plasma gun.

During the welding tractor system is operating, the trolley is in circular movement along the annular rack, and the plasma gun processes and welds the pipeline located in the middle of the annular rack.

Optionally, the trolley includes a base, a gear, and a drive motor, the drive motor is in drive connection to the gear, the gear is mounted to the base, and the gear is engaged with the rack, and the base is mounted in sliding connection to the track.

Optionally, the wire feeding mechanism includes a welding wire reel, a wire feeder, and a wire feeding guide frame, the wire feeding guide frame is mounted to the trolley. The welding wire reel and the wire feeder are respectively mounted to the wire feeding guide frame, and an output end of the wire feeder is oriented towards an output end of the plasma gun. The plasma gun and the wire feeder cooperate with each other to complete a welding action.

Optionally, the gas protection device includes an outer protection device and a back protection device, the outer protection device is fixedly connected to the welding tractor system, the outer protection device is located at an outer side of the pipeline, and the back protection device is located at an inner side of the pipeline. The outer protection device protects an outer side face of the pipeline, the back protection device protects the inner side of the pipeline, and the outer protection device and the back protection device, in cooperation, may achieve all-round protection for a welding part of the pipeline.

Optionally, the outer protection device includes a first gas hood of a bracket, the bracket is mounted to the welding tractor system, and the first gas hood is mounted to an end of the bracket away from the welding tractor system. The back protection device may include a guiding mechanism and a second gas hood, the second gas hood is mounted at an output end of the guiding mechanism, the guiding mechanism drives the second gas hood to rotate, a shaft axis of rotation of the second gas hood overlaps the shaft axis of the annular rack, the second gas hood and the first gas hood are provided at an interval, and the pipeline is located between the first gas hood and the second gas hood.

Optionally, the first gas hood and the second gas hood are provided corresponding to each other, and an angular velocity of rotation of the guiding mechanism is the same as an angular velocity of rotation of the welding tractor system. The first gas hood and the second gas hood move in synchronization, and the welding part of the pipeline may be better protected.

Optionally, the welding system further includes a back weld visual system, the back weld visual system includes a camera assembly, a liquid crystal optical monitor, and a light source, the camera assembly and the light source are respectively mounted to an end of the guiding mechanism close to the second gas hood, and the liquid crystal optical monitor is electrically connected to the camera assembly.

Optionally, the clamping structure includes a plurality of screw rod slide block mechanisms, the plurality of screw rod slide block mechanisms are provided at intervals along a circumferential direction of the track, and axes of the screw rod slide block mechanisms pass through a center of a circle of the track. The screw rod and the slide blocks cooperate with each other to clamp and fix the pipeline.

A welding system uses the above method of all-position plasma welding process for titanium alloy pipeline to obtain a titanium alloy pipeline product. The welding system includes a welding tractor system, a gas protection device, an operation and control system, and a clamping device for fixing a pipeline; wherein the clamping device includes an annular rack, a fastening structure, and two tracks each in a semi-circular shape, the two tracks are assembled to form an annular shape, the annular rack is mounted to the tracks, the fastening structure is mounted to inner sides of the tracks, the welding tractor system is mounted to the annular rack, and the welding tractor system may rotate along the annular rack, the gas protection device is fixedly connected to the welding tractor system, and the welding tractor system and the gas protection device are in electrical connection to the operation and control system, respectively.

After the pre-welding treatment of grooving and so on is performed to the pipeline that needs to be welded, the pipeline is connected to the welding tractor system through the clamping device. The welding tractor system completes the welding according to the preset welding parameters.

Compared with the prior art, the present disclosure achieves following beneficial effects: the method of all-position plasma welding process for titanium alloy pipeline provided in the present disclosure has lowered requirements to the groove, short welding time, high production efficiency, and greatly reduced production costs, meanwhile renders a circumferential weld of the titanium alloy pipeline with excellent comprehensive performances.

BRIEF DESCRIPTION OF THE DRAWINGS

In order to more clearly illustrate embodiments of the present disclosure or technical solutions in the prior art, accompanying drawings which are needed for description of the embodiments or the prior art will be introduced briefly below. Apparently, the accompanying drawings in the description below are merely for some embodiments of the present disclosure. A person ordinarily skilled in the art still can obtain other relevant drawings in light of these accompanying drawings, without paying inventive effort.

Figure 1:
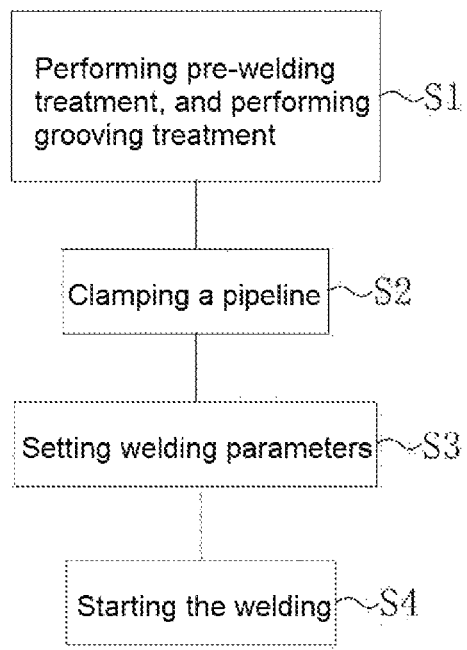
FIG. 1 shows a diagram of steps of a method of all-position plasma welding process for titanium alloy pipeline provided in an embodiment of the present disclosure.

Reference signs: 101—pipeline; 102—groove; 11—clamping device; 12—welding tractor system; 13—gas protection device; 104—pipeline; 105—track; 106—annular rack; 107—fastening structure; 108—trolley; 109—welding wire reel; 110—wire feeding guide frame; 111—wire feeder; 112—plasma gun; 113—base; 114—gear; 115—drive motor.

DETAILED DESCRIPTION OF THE INVENTION

The present disclosure is further described below in detail through embodiments in combination with accompanying drawings.

In order to make the objects, technical solutions, and advantages of the embodiments of the present disclosure clearer, the technical solutions in the embodiments of the present disclosure will be described below clearly and completely in conjunction with the accompanying drawings in the embodiments of the present disclosure, apparently, some but not all embodiments of the present disclosure are described. Generally, components in the embodiments of the present disclosure described and shown in the accompanying drawings herein may be arranged and designed in different configurations.

Therefore, the detailed description above of the embodiments of the present disclosure provided in the accompanying drawings is not intended to limit the scope of protection of the present disclosure, but merely represents chosen embodiments of the present disclosure. Based on the embodiments of the present disclosure, all other embodiments obtained by a person ordinarily skilled in the art, without paying inventive effort, shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be understood that terms indicating orientational or positional relationships are based on orientational or positional relationships as shown in the accompanying drawings, merely for facilitating describing the present disclosure and simplifying the description, rather than indicating or suggesting that related devices or elements have to be in the specific orientation or configured and operated in a specific orientation, therefore, they should not be construed as limiting the present disclosure.

In the present disclosure, unless otherwise specified and defined explicitly, terms "mount", "join", "connect", "fix" and so on should be construed in a broad sense. For example, it may be fixed connection, or integrated connection; it may be mechanical connection, or electrical connection; it may be direct connection, indirect connection through an intermediate medium, or inner communication between two elements or interaction relationship between two elements. For a person ordinarily skilled in the art, specific meanings of the above-mentioned terms in the present disclosure may be understood according to specific circumstances.

It should be noted that the embodiments in the present disclosure and the features in the embodiments in the present disclosure may be combined with each other if there is no conflict.

Plasma arc welding is a welding method with plasma arc as a heat source. A gas, heated by an electric arc and dissociated, is compressed when passing through a water-cooled nozzle at speed, thus energy density and a dissociation degree are increased, and a plasma arc is formed. The stability, heating value, and temperature of the plasma arc are all higher than those of a common electric arc, therefore, the plasma arc has a relatively great penetration force and a relatively great welding speed, and can achieve one-time molding for panels with a medium thickness. All-position automatic welding is a novel welding process for pipelines. The automatic welding has advantages of high operation efficiency, good weld quality, high welding stability and reliability, capability of releasing labor, and so on; however, since it is not suitable to rotate a pipe during construction and installation at a site, the all-position welding process starts to be developed vigorously in China and abroad. At present, relatively developed all-position automatic welding methods for pipelines include argon tungsten-arc welding and consumable electrode arc welding. Currently, all-position Tungsten Inert Gas (TIG) welding and all-position consumable electrode arc welding have been widely applied to pipeline welding at a site. The application of the argon tungsten-arc welding in the all-position pipeline welding mainly faces a problem of low welding efficiency. In contrast, arc energies and deposition efficiency of the consumable electrode arc welding are higher than those of the TIG welding. The difficulty of the all-position consumable electrode arc welding lies in control over formation of welds, essentially in achieving low splash or zero splash for the control over molten drop transfer, thus improving the welding quality, and eliminating the phenomenon of congestion of weld pass. The inventors found from researches that existing all-position automatic welding apparatus at least has following defects: the existing all-position automatic welding is low in operation efficiency, and poor in welding stability.

Embodiment 1

Figure 2:
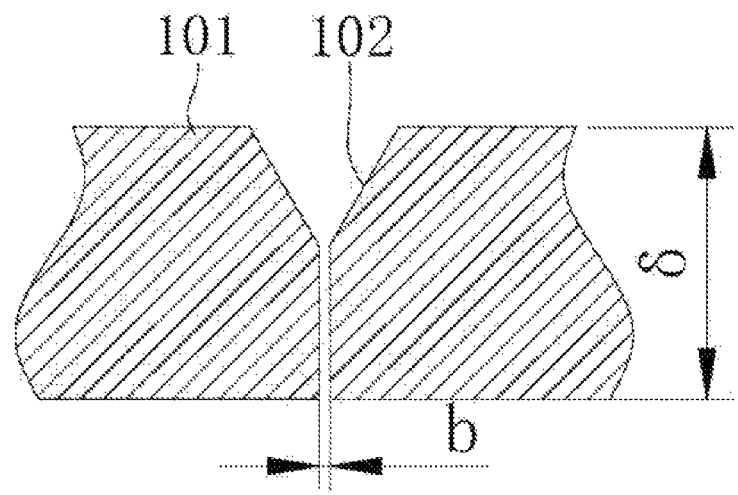
FIG. 2 shows a schematic diagram of a pipeline position provided in an embodiment of the present disclosure.
Figure 3:
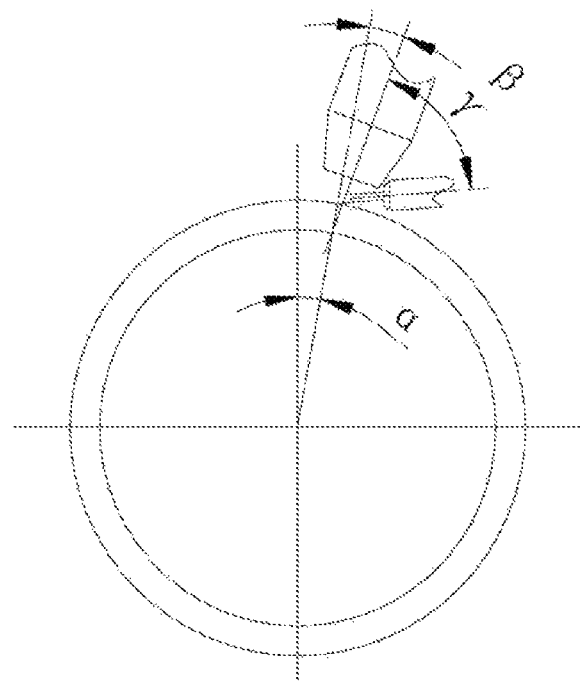
FIG. 3 shows a schematic diagram of parameters provided in an embodiment of the present disclosure.

Referring to FIG. 1, FIG. 2, and FIG. 3, the present embodiment provides a method of all-position plasma welding process for titanium alloy pipeline, for welding a titanium alloy pipeline 101 made of TA2 or TC4, with a wall thickness of 9 mm to 16 mm, and a pipe diameter of 108 mm or more, the method includes the following steps:
S1: performing pre-welding treatment for the pipeline 101, and performing grooving treatment for the pipeline;
S2: clamping the pipeline 101;
S3: setting welding parameters;
S4: starting the welding.

The method of all-position plasma welding process for titanium alloy pipeline provided in the present disclosure has reduced requirements to a groove 102, has a short welding time and high production efficiency, and has greatly reduced production costs, and meanwhile renders a circumferential weld of the titanium alloy pipeline 101 with excellent comprehensive performances, which may replace the all-position argon tungsten-arc welding for titanium alloy pipelines with a medium thickness, and has a broad application prospect.

The pre-welding treatment includes polishing, cleaning, and scrubbing, a polished axial length is 30 mm to 50 mm, and end openings of the pipeline 101 also need to be polished, and then the polished parts are cleaned, and the cleaned pipeline 101 is scrubbed with acetone.

During the polishing, the pipeline 101 may be polished until metallic luster appears.

The welding parameters may include parameters of an endoscopic back forming protection system: a rotation speed and a gas protection flow rate of an endoscopic gas protection device are set, wherein the endoscopic gas protection device moves synchronously with a plasma welding gun during the welding, and performs gas protection to formation of a back face of a weld. The weld is positioned by an endoscopic photographing device, the gas enters a back gas dragging shield through the pipeline 101, in a welding process, the device may move synchronously with a head of the plasma arc welding gun, so as to facilitate real-time protection to the weld.

The welding parameters may also include parameters of a welding gun swinging device: parameters of a swing angle of the welding gun are set, then an angle between the welding gun and a tangent plane of the pipeline 101 may be changed as required at any time during the welding. Thus, a problem of an electric arc angle is solved.

Parameters of an electric arc AVC tracking system may include: parameters for feeding back and adjusting an electric arc height are set in the welding process, for keeping the electric arc stable, so as to improve the stability of the welding process.

A welding protection dragging shield may include: a protection gas flow rate inside the dragging shield is set, then a welding joint in a high-temperature state may be protected in the welding process, so as to prevent titanium from being oxidized in air when being exposed in the high-temperature state.

A wire feeding device may include: wire feeding parameters of an independent wire feeding mechanism are set, then welding in two modes, namely, a mode with filler wire and a mode without filler wire, may be realized in the welding process.

A swinging amplitude of the electric arc may include: setting a swinging angle of the electric arc, so as to enable a liquid metal to expand in a uniform manner in a process of filler wire welding, fill a whole welded junction, to form completed weld.

During installation of the pipeline 101, a distance b between two pipelines 101 to be welded is less than 0.5 mm (as illustrated in FIG. 2).

The method of all-position plasma welding process for titanium alloy pipeline includes backing welding, filling welding, and covering welding. The backing welding or keyhole type technology includes 12 sections/settings (a welding starting position is set as) 0°, with the 12 sections/settings being respectively as follows:
a set range of a first section is: 0°~30°;
a set range of a second section is: 2°~50°;
a set range of a third section is: 20°~70°;
a set range of a fourth section is: 40°~150°;
a set range of a fifth section is: 60°~210°;
a set range of a sixth section is: 90°~310°;
a set range of a seventh section is: 100°~345°;
a set range of an eighth section is: 120°~370°;
a set range of a ninth section is: 150°~370°;
a set range of a tenth section is: 180°~370°;
a set range of an eleventh section is: 270°~370°;
a set range of a twelfth section is: 300°~370°.

The filling welding and the covering welding each include 6 sections (a welding starting position is set as 0°), with the 6 sections being respectively as follows:
a set range of a first section is: 0°~50°;
a set range of a second section is: 30°~130°;

a set range of a third section is: 90°~190°;
a set range of a fourth section is: 120°~280°;
a set range of a fifth section is: 150°~310°;
a set range of a sixth section is: 180°~370°.

Continue to refer to FIG. 3, before the welding is started, a welding manner and a welding section need to be selected according to physical properties and electric arc properties of a material of the pipeline 101.

Parameters that need to be set for the backing welding or the keyhole type technology include a welding starting position, an inclination angle of the welding gun, a pulse background current, a peak current, a smoothing current, a pulse frequency, an ion gas flow rate, a duty cycle, a protection gas flow rate, a dragging shield gas flow rate, a back protection gas flow rate, and a welding speed. The welding starting position is $|\alpha|<90°$, the inclination angle of the welding gun is $|\beta|<15°$, the pulse background current is 40~210 A, the peak current is 150~420 A, the smoothing current is 135~420 A, the pulse frequency is 1~100 Hz, the ion gas flow rate is 1~10 L/min, the duty cycle is 10~90%, the protection gas flow rate is 10~35 L/min, the dragging shield gas flow rate is 25~95 L/min, the back protection gas flow rate is 25~-85 L/min, and the welding speed is 70~300 mm/min.

Parameters that need to be set for the filling welding and the covering welding include a welding starting position, an inclination angle of the welding gun, a filler wire position, a pulse background current, a peak current, a smoothing current, a pulse frequency, a protection gas flow rate, a duty cycle, an ion gas flow rate, a dragging shield gas flow rate, a back protection gas flow rate, a wire feeding speed, a diameter of a welding wire, a swinging amplitude of the welding gun, and a welding speed. The welding starting position is $|\alpha|<900$, the inclination angle of the welding gun is $|\beta|<15°$, the filler wire position is $45°<|\gamma|<75°$, the pulse background current is 40~110 A, the peak current is 80~420 A, the smoothing current is 135~420 A, the pulse frequency is 1~100 Hz, the protection gas flow rate is 1~25 L/min, the duty cycle is 10~90%, the ion gas flow rate is 1~10 L/min, the dragging shield gas flow rate is 25~95 L/min, the back protection gas flow rate is 10~35 L/min, the wire feeding speed is 0~4000 mm/min, the diameter of the welding wire is 0.8~1.4 mm, the swinging amplitude of the welding gun is −25 mm~+25 mm, and the welding speed is 70~300 mm/min.

The method of all-position plasma welding process for titanium alloy pipeline further includes a preliminary experiment, and the preliminary experiment is used to measure a lowest keyhole voltage of a keyhole type plasma arc.

Specific operations of the method of all-position plasma welding process for titanium alloy pipeline provided in the present embodiment are as follows.

S1: firstly, a groove 102 needs to be processed at a corresponding position of the pipeline 101, then polishing, cleaning, and scrubbing are carried out for the pipeline 101, wherein the polishing should be performed until the welded junction completely shows metallic luster, a polishing range is an axial length of 30~50 mm of inner and outer walls and end openings of the pipeline 101, so as to ensure that welding defects such as entrainment due to residues of a surface oxidation layer will not occur to the pipeline 101 in the welding process; then the pipeline 101 is cleaned, and after the cleaning, the pipeline is cleaned and scrubbed multiple times with acetone, and touching a to-be-welded area is forbidden after the cleaning and scrubbing.

S2: the pipeline 101 is clamped, wherein in the clamping process of the pipeline 101, two to-be-welded end faces of the pipeline 101 should be ensured to have a certain parallel gap, which parallel gap b has to be less than 0.5 mm. If the gap is too big (large), the end faces of the pipeline 101 cannot contact, and the plasma arc will go over the pipeline 101, and can hardly melt a base material or ensure a coaxiality degree and mechanical performances of a joint and symmetry of formation of the weld.

S3: before the welding is started, parameters of the welding process have to be set, and the welding parameters are recorded in a continuous program according to a use order, so as to ensure integrity of the welding process. When setting the parameters of the technology, different procedure parameters should be set according to different positions of the pipeline 101. Before setting the parameters of the welding process, the preliminary test should be firstly carried out, to measure the lowest keyhole voltage of the keyhole type plasma arc. A size of a diameter of a tungsten electrode may change thickness of an electric arc, and a bore diameter of a nozzle and neck-in of the tungsten electrode will affect a keyhole current of the electric arc, in one time of test, the three parameters should not be changed, and an appropriate combination should be chosen before the welding.

In the above, main parameters that need to be set for the method of all-position plasma welding process for titanium alloy pipeline provided in the present embodiment include a background current for maintaining a weld pool and a peak current for key punching, a pulse frequency which is an important parameter affecting formation of a front face of the weld, a duty cycle determining relationship between the peak current and the background current in one cycle, and a protection gas flow rate. The five parameters are of great significance to the effect of key punching. When the peak current forms small holes on the base material, the liquid metal is extruded by a plasma arc gas out of the small holes; when the current reaches the background current, the liquid metal flows into the small holes and is solidified to form the weld. The weld formed has a too high temperature, and the welding joint in a high-temperature state should be protected with the dragging shield, to prevent it from being oxidized. The welding speed is generally selected according to the welding current, so as to prevent occurrence of welding defects such as humps.

S4: the welding manner and the welding section should be selected according to the physical properties of the material of the pipeline 101 and the electric arc properties, and the welding is started, wherein before the welding, the pipeline 101 is cleaned and scrubbed again with acetone, an all-position plasma welding apparatus is activated to perform the welding by section, and in the welding process, the test will be carried out in a pre-set order of the procedure.

The inventors carried out a series of experiments using the method of all-position plasma welding process for titanium alloy pipeline provided in the present embodiment, and experiment data is as follows:

Specification of the technology: before the welding, an end surface of the to-be-welded pipeline 101 is polished to show metallic luster, with a polishing range being 30~50 mm of inner and outer axial walls of the pipeline 101 and the end openings of the pipeline 101. After the clamping, two to-be-welded end faces of the pipeline 101 have the gap b<0.5 mm Other conditions of the technology are listed in a following table:

| | | | | | | | | |
|---|---|---|---|---|---|---|---|---|
| diameter of tungsten electrode: 4 mm neck-in of tungsten electrode: 3 mm bore diameter of nozzle: 3 mm wire filling speed: 0 mm swinging angle of electric arc: 0° | | | | | | | | |
| test position | inclination angle of welding gun (°) | background current/ (A) | peak current/ (A) | pulse frequency/ (Hz) | welding speed (mm/min) | ion gas flow rate (L/min) | electric arc height (mm) | duty cycle |
| 0°~2° | 0 | 0 | 160 | | 130 | 3.5 | 4 | 1 |
| 2°~20° | 0 | 85 | 165 | 5.5 | 130 | 5.3 | 4 | 60% |
| 20°~70° | 0 | 85 | 165 | 5.5 | 130 | 5.8 | 4 | 60% |
| 70°~110° | 0 | 85 | 160 | 5.5 | 130 | 5.7 | 4 | 60% |
| 110°~130° | 0 | 80 | 165 | 5.5 | 130 | 6 | 4 | 60% |
| 130°~150° | 0 | 80 | 165 | 6 | 130 | 6.5 | 4 | 60% |
| 150°~210° | 0 | 80 | 165 | 7 | 130 | 6.5 | 4 | 60% |
| 210°~310° | 0 | 80 | 165 | 5.5 | 130 | 5.6 | 4 | 60% |
| 310°~355° | 0 | 80 | 165 | 5.5 | 130 | 5.3 | 4 | 60% |
| 355°~365° | 0 | | 150 | | 90 | 5.0 | 4 | 1 |

The joint of the pipeline 101 welded and formed by the above method is higher than the base material in tensile strength and ductile fracture, and the joint has no cracks when being laterally bent by 180°, thus the welding quality is good, and conforms to provisions of the JB/T4745-2002 standard "Titanium Welded Vessels".

Embodiment 2

Figure 4:
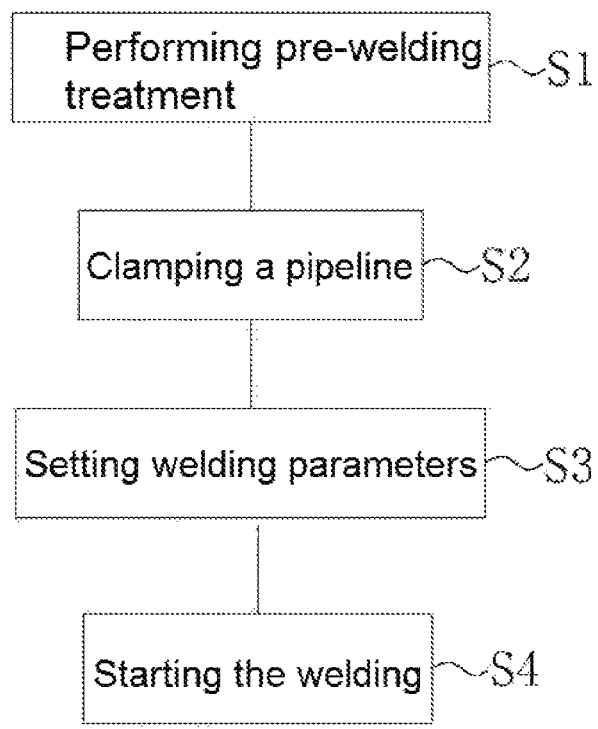
FIG. 4 shows another diagram of steps of the method of all-position plasma welding process for titanium alloy pipeline provided in an embodiment of the present disclosure.
Figure 5:
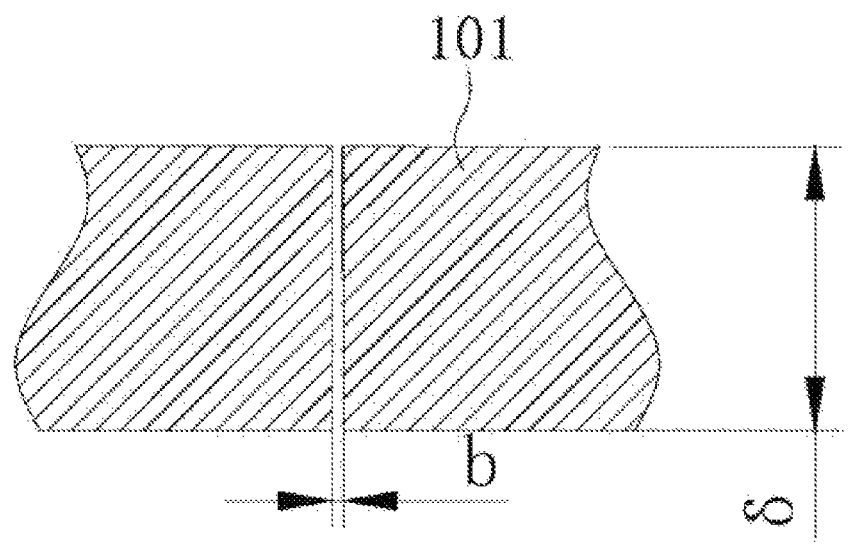
FIG. 5 shows a schematic diagram of another pipeline position provided in an embodiment of the present disclosure.
Figure 6:
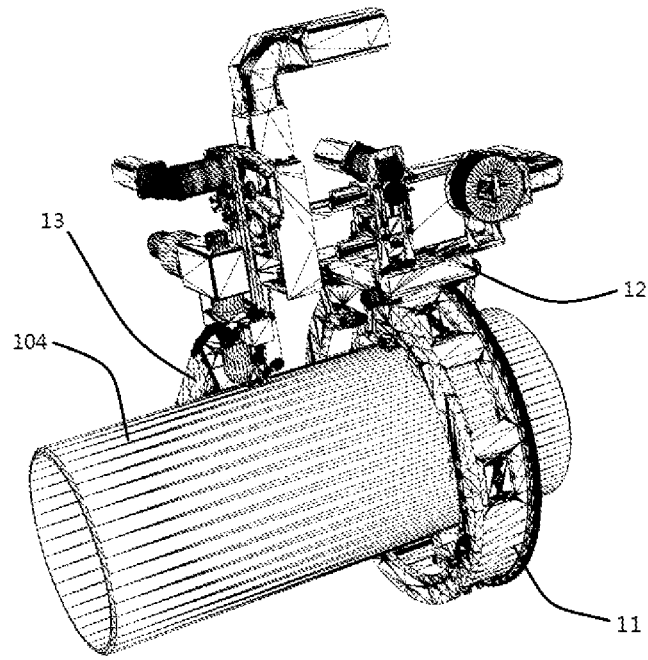
FIG. 6 shows an operation schematic diagram of an all-position plasma welding system provided in an embodiment of the present disclosure.
Figure 7:
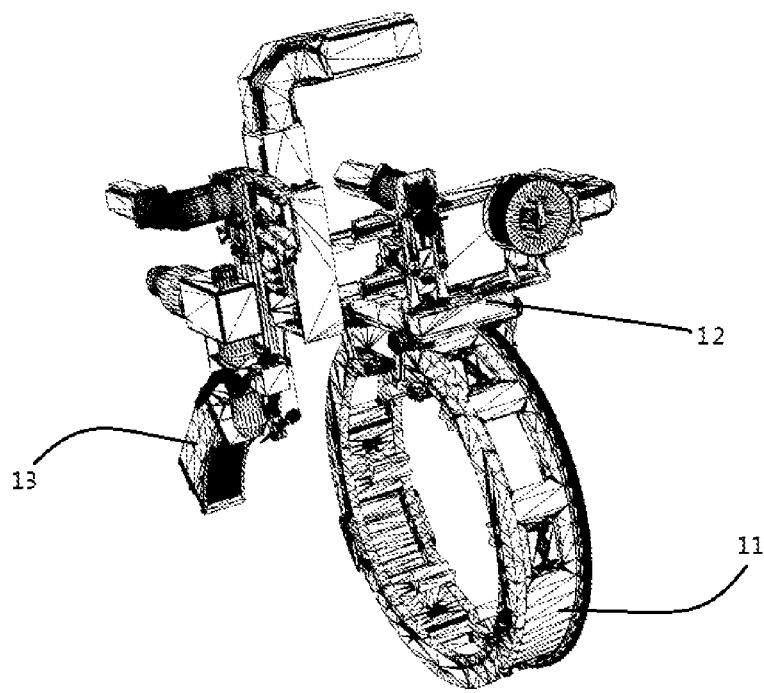
FIG. 7 shows a schematic diagram of the all-position plasma welding system provided in an embodiment of the present disclosure.
Figure 8:
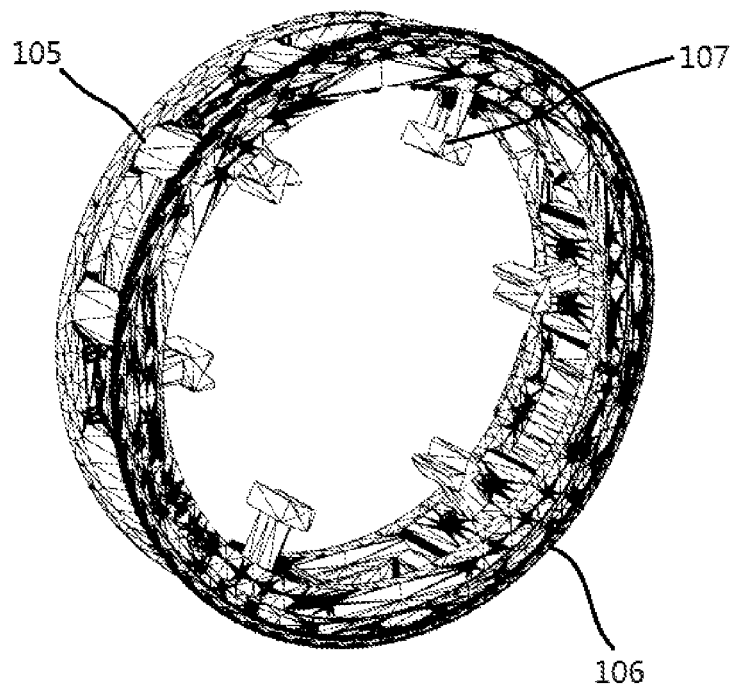
FIG. 8 shows a schematic diagram of a clamping device provided in an embodiment of the present disclosure.
Figure 9:
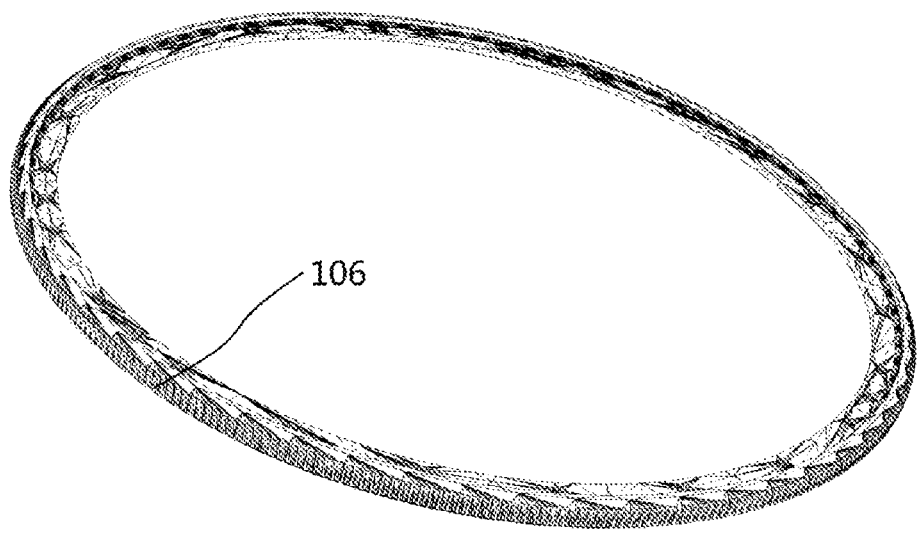
FIG. 9 shows a schematic diagram of an annular rack provided in an embodiment of the present disclosure.
Figure 10:
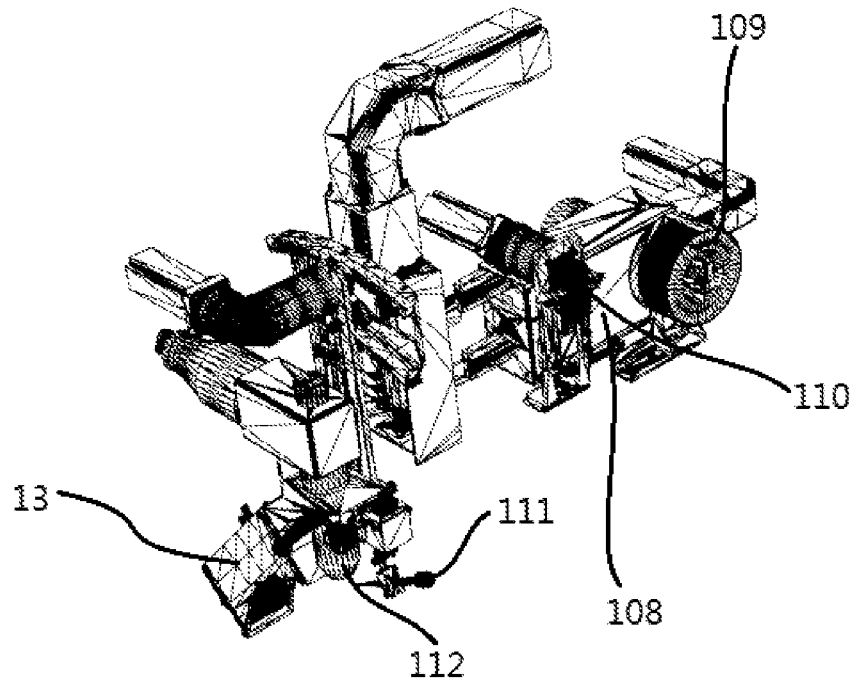
FIG. 10 shows a schematic diagram of a welding tractor system provided in an embodiment of the present disclosure.
Figure 11:
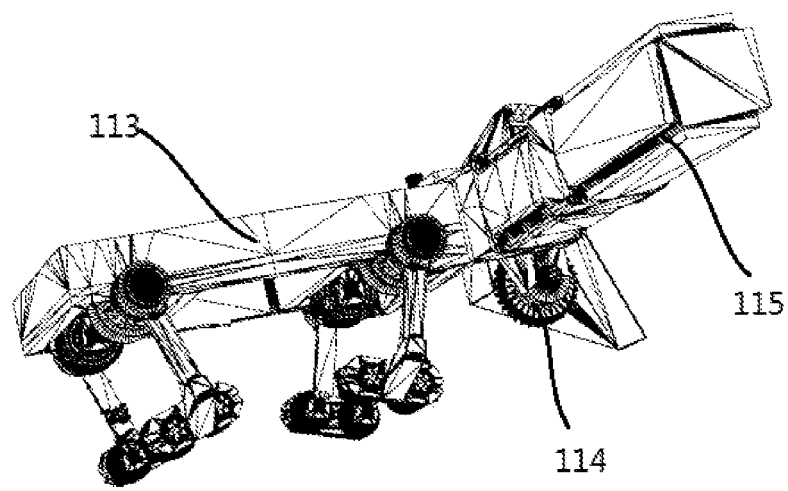
FIG. 11 shows a schematic diagram of a trolley provided in an embodiment of the present disclosure.

Referring to FIG. 4 and FIG. 5, the present embodiment further provides a method of all-position plasma welding process for titanium alloy pipeline, the present embodiment is further alteration on the basis of the technical solution of Embodiment 1, the technical solution described in Embodiment 1 is also applied to the present embodiment, and the technical solution already disclosed in Embodiment 1 is not repeatedly described.

Specifically, the present embodiment is distinguished from Embodiment 1 in that the method of all-position plasma welding process for titanium alloy pipeline provided in the present embodiment is directed to welding performed for a pipeline 101 with a wall thickness of 3 mm to 9 mm, and in the present embodiment, when the pipeline 101 is welded, the keyhole type technology may be used for one-time welding formation.

Furthermore, the method of all-position plasma welding process for titanium alloy pipeline includes following steps:

S1: performing pre-welding treatment for the pipeline;
S2: clamping the pipeline;
S3: setting welding parameters;
S4: starting the welding.

Upon the pre-welding treatment, since the keyhole type technology is used for one-time welding formation, there is no need for the grooving treatment.

Embodiment 3

Referring to FIG. 6 to FIG. 11, an embodiment of the present disclosure provides an all-position plasma welding system, including a welding tractor system 12, a gas protection device 13, and a clamping device 11 for fixing a pipeline 104, the clamping device 11 includes an annular rack 106, a fastening structure 107, and two tracks 105 each in a semi-circular shape, the two tracks 105 are assembled to form an annular shape, the annular rack 106 is mounted to the tracks 105, the fastening structure 107 is mounted to inner sides of the tracks 105, the welding tractor system 12 is mounted to the annular rack 106, and the welding tractor system 12 may rotate along the annular rack 106, the gas protection device 13 is fixedly connected to the welding tractor system 12.

In the all-position plasma welding system provided in the present disclosure, the welding tractor system 12 is provided with the gas protection device 13, in the welding, the gas protection device 13 moves together with the welding tractor system 12, and performs the gas protection to the welding position at any time, such operation manner is high in operation efficiency, good in weld quality, high in welding stability and reliability, strong in universality, and relatively high in the welding stability.

Furthermore, the welding tractor system 12 includes a trolley 108, a plasma gun 112, and a wire feeding mechanism, the trolley 108 is mounted to the annular rack 106, the trolley 108 is in sliding connection to the annular rack 106, the trolley 108 moves relative to the annular rack 106 around a shaft axis of the annular rack 106, the plasma gun 112 and the wire feeding mechanism are respectively mounted to the trolley 108, the plasma gun 112 and the wire feeding mechanism are provided at an interval, and an output end of the wire feeding mechanism is oriented towards an output end of the plasma gun 112. During the welding tractor system 12 is operating, the trolley 108 is in circular movement along the annular rack 106, and processes and welds the pipeline 104 located in the middle of the annular rack 106.

Optionally, the trolley 108 includes a base 113, a gear 114, and a drive motor 115, the drive motor 115 is in drive connection to the gear 114, the gear 114 is mounted to the base 113, and the gear 114 is engaged with the rack, the base 113 is mounted in sliding connection to the track 105. When the welding tractor system 12 is operating, the gear 114 is driven by the drive motor 115 to rotate, at this time the gear 114 drives the trolley 108 to move, the drive motor 115 and the gear 114 have driving and locating functions to the trolley 108.

Furthermore, the wire feeding mechanism includes a welding wire reel 109, a wire feeder 111, and a wire feeding guide frame 110, the wire feeding guide frame 110 is mounted to the trolley 108, the welding wire reel 109 and the wire feeder 111 are respectively mounted to the wire feeding guide frame 110, an output end of the wire feeder 111 is oriented towards an output end of the plasma gun 112. The plasma gun 112 and the wire feeder 111 cooperate with each other to complete a welding action.

Optionally, the gas protection device 13 includes an outer protection device and a back protection device, the outer protection device is fixedly connected to the welding tractor system 12, the outer protection device is located at an outer side of the pipeline 104, the back protection device is located at an inner side of the pipeline 104. The outer protection device protects an outer side face of the pipeline 104, the back protection device protects the inner side of the pipeline 104, through the cooperation of the outer protection device and the back protection device, all-round protection can be performed for the welding part of the pipeline 104, thus improving the welding quality and the welding efficiency.

Optionally, the outer protection device includes a first gas hood of a bracket, the bracket is mounted to the welding tractor system 12, and the first gas hood is mounted to an end of the bracket away from the welding tractor system 12; the back protection device includes a guiding mechanism and a second gas hood, the second gas hood is mounted at an output end of the guiding mechanism, the guiding mechanism drives the second gas hood to rotate, a shaft axis of rotation of the second gas hood overlaps the shaft axis of the annular rack 106, the second gas hood and the first gas hood are provided at an interval, and the pipeline 104 is located between the first gas hood and the second gas hood.

The first gas hood and the second gas hood are provided corresponding to each other, and an angular velocity of rotation of the guiding mechanism is the same as an angular velocity of rotation of the welding tractor system 12. In this way, the first gas hood and the second gas hood may move in synchronization, and the welding part of the pipeline 104 may be better protected.

Furthermore, the all-position plasma welding system further includes a back weld visual system, the back weld visual system includes a camera assembly, a liquid crystal optical monitor, and a light source, the camera assembly and the light source are respectively mounted to an end of the guiding mechanism close to the second gas hood, and the liquid crystal optical monitor is electrically connected to the camera assembly. The formation of a back face of the weld and the welding effect are displayed in real time through the liquid crystal optical monitor and the welding parameters are adjusted at any time, thus achieving the object of improving the welding quality of the weld.

Optionally, the clamping structure 107 includes a plurality of screw rod slide block mechanisms, the plurality of screw rod slide block mechanisms are provided at intervals along a circumferential direction of the track 105, and axes of the screw rod slide block mechanisms pass through a center of a circle of the track 105. The plurality of screw rods and slide blocks cooperate with each other to clamp and fix the pipeline 104, to enable the pipeline 104 and the annular rack 106 to have higher degree of coaxiality, thus improving the welding quality.

In the above, 6 screw rod slide block mechanisms may be provided, the 6 screw rod slide block mechanisms can well clamp and position the pipeline 104, and meanwhile, the operation is also quite convenient at this time.

In use, before the welding, the pipeline 104 is placed inside the track 105, the plurality of screw rod slide blocks are controlled to fix the pipeline 104, then the trolley 108 is adjusted, to enable the plasma gun 112 and the wire feeder 111 to be aligned with the welding part of the pipeline 104, positions of the first gas hood and the second gas hood are adjusted to protect the to-be-welded part of the pipeline 104, and when the plasma gun 112 starts to operate, the drive motor 115 drives the gear 114 to rotate, the gear 114 drives the trolley 108 to move, meanwhile, the guiding mechanism drives the second gas hood to rotate, such that the first gas hood and the second gas hood form protection to the pipeline 104, and the formation of the back face of the weld and the welding effect are displayed in real time through the liquid crystal optical monitor and the welding parameters are adjusted in real time, thus achieving the object of improving the welding quality of the weld.

It should be indicated that in other embodiments of the present disclosure, furthermore, the welding system may include a welding tractor system 12, a gas protection device 13, an operation and control system, and a clamping device 11 for fixing a pipeline 104, wherein the clamping device 11 includes an annular rack 106, a fastening structure 107, and two tracks 105 each in a semi-circular shape, the two tracks 105 are assembled to form an annular shape, the annular rack 106 is mounted to the tracks 105, the fastening structure 107 is mounted to inner sides of the tracks 105, the welding tractor system 12 is mounted to the annular rack 106, and the welding tractor system 12 may rotate along the annular rack 106, the gas protection device 13 is fixedly connected to the welding tractor system 12, and the welding tractor system 12 and the gas protection device 13 are in electrical connection to the operation and control system, respectively.

After the pre-welding treatment of grooving and so on is performed to the pipeline 104 that needs to be welded, the pipeline 104 is connected to the welding tractor system 12 through the clamping device.

The welding tractor system 12 completes the welding according to the preset welding parameters.

In the all-position plasma welding system provided in the present embodiment, the welding tractor system 12 is provided with the gas protection device 13, in the welding, the gas protection device 13 moves together with the welding tractor system 12, and performs the gas protection to the welding position at any time, such operation manner is high in operation efficiency, good in weld quality, high in welding stability and reliability, high in the degree of automation, strong in universality, and relatively high in the welding stability.

In the above, the control system mainly consists of a control cabinet, an operation platform, and a hand-held operation box. The control system may set corresponding parameters of the welding standard according to specifications and materials of different pipelines, four sets of parameters may be stored in total to be invoked at any time. When the all-position plasma welding is performed, the welding parameters are automatically adjusted with changes of the welding position, and the welding parameters are controlled by section. The hand-held control box and the control cabinet are in wireless connection, with functions of wire extraction/feeding, position setting, start and stop and emergency stop of the welding, forward and backward rotation, welding position adjustment and so on.

The above-mentioned are merely for preferred embodiments of the present disclosure and not used to limit the present disclosure. For one skilled in the art, various modifications and changes may be made to the present disclosure. Any amendments, equivalent replacements, improvements and so on, within the spirit and principle of the present disclosure, should be covered by the scope of protection of the present disclosure.

INDUSTRIAL APPLICABILITY

The method of all-position plasma welding process for titanium alloy pipeline provided in the present disclosure is used to weld a titanium alloy pipeline made of TA2 or TC4, with a wall thickness of 3~16 mm, and a pipe diameter of 108 mm or more. When the wall thickness is 3~9 mm, the keyhole type technology may be used for one-time welding formation, and when the wall thickness is 9~16 mm, the grooving treatment needs to be performed for the pipeline, and the keyhole type technology is used for the backing welding, and then the filling welding and the covering welding are performed using filler wire welding through a melt-in technology. Thus, the requirements to the groove are reduced, the welding time is short, the production efficiency is high, the production costs are greatly reduced, and meanwhile, the circumferential weld of the titanium alloy pipeline with excellent comprehensive performances is obtained.

The invention claimed is:

1. A method of all-position plasma welding process for titanium alloy pipeline, for welding a titanium alloy pipeline made of TA2 or TC4, with a wall thickness of 9 mm to 16 mm, and a pipe diameter of 108 mm or more, comprising following steps:
S1: performing pre-welding treatment for the pipeline, and performing grooving treatment for the pipeline;
S2: clamping the pipeline;
S3: setting welding parameters; and
S4: starting the welding,
wherein the welding parameters comprise:
parameters of an endoscopic back forming protection system: a rotation speed and a gas protection flow rate of an endoscopic gas protection device, wherein the endoscopic gas protection device moves synchronously with a plasma welding gun during the welding, and performs gas protection to formation of a back face of a weld;
parameters of a welding gun swinging device: parameters of a swing angle of the welding gun, so as to be capable of changing an angle between the welding gun and a tangent plane of the pipeline as required at any time during the welding;
parameters of an electric arc AVC tracking system: parameters for feeding back and adjusting an electric arc height in the welding process, for keeping the electric arc stable;
parameters of a welding protection dragging shield: a protection gas flow rate inside the dragging shield, so as to be capable of protecting a welding joint in a high-temperature state in the welding process;
parameters of a wire feeding device: wire feeding parameters of an independent wire feeding mechanism, so as to realize welding in two modes, namely, a mode with filler wire and a mode without filler wire, in the welding process; and
a swinging amplitude of the electric arc: a swinging angle of the electric arc, so as to enable a liquid metal to expand in a uniform manner in a process of filler wire welding, so as to fill a whole welded junction to form a completed weld.

2. The method of all-position plasma welding process for titanium alloy pipeline according to claim 1, wherein the pre-welding treatment comprises polishing, cleaning, and scrubbing, a polished axial length is 30 mm to 50 mm, and end openings of the pipeline are also polished, and then polished parts are cleaned, and the cleaned pipeline is scrubbed with acetone.

3. The method of all-position plasma welding process for titanium alloy pipeline according to claim 2, wherein after the polished parts are cleaned, the pipeline is cleaned and scrubbed multiple times with acetone, and touching a to-be-welded area is forbidden after the cleaning and scrubbing.

4. The method of all-position plasma welding process for titanium alloy pipeline according to claim 2, wherein the polishing is performed until the pipeline shows metallic luster.

5. The method of all-position plasma welding process for titanium alloy pipeline according to claim 1, wherein during installation of the pipeline, a distance (b) between two pipelines to be welded is less than 0.5 mm.

6. The method of all-position plasma welding process for titanium alloy pipeline according to claim 1, wherein the method of all-position plasma welding process for titanium alloy pipeline comprises backing welding, filling welding, and covering welding,
the backing welding (or keyhole type process) comprises 12 sections wherein a welding starting position is set as 0°, with the 12 sections being respectively as follows:
a set range of a first section is: 0°~30°;
a set range of a second section is: 2°~50°;
a set range of a third section is: 20°~70°;
a set range of a fourth section is: 40°~150°;
a set range of a fifth section is: 60°~210°;
a set range of a sixth section is: 90°~310°;
a set range of a seventh section is: 100°~345°;
a set range of an eighth section is: 120°~370°;
a set range of a ninth section is: 150°~370°;
a set range of a tenth section is: 180°~370°;
a set range of an eleventh section is: 270°~370°;
a set range of a twelfth section is: 300°~370°;
the filling welding and the covering welding each comprise 6 sections wherein a welding starting position is set as 0°, with the 6 sections being respectively as follows:
a set range of a first section is: 0°~50°;
a set range of a second section is: 30°~130°;
a set range of a third section is: 90°~190°;
a set range of a fourth section is: 120°~280°;
a set range of a fifth section is: 150°~310°;
a set range of a sixth section is: 180°~370°;
before the welding is started, a welding manner and a welding section are selected according to physical properties and electric arc properties of a material of the pipeline.

7. The method of all-position plasma welding process for titanium alloy pipeline according to claim 6, wherein parameters set for the backing welding or the keyhole type process comprise a welding starting position, an inclination angle of the welding gun, a pulse background current, a peak current, a smoothing current, a pulse frequency, an ion gas flow rate, a duty cycle, a protection gas flow rate, a dragging shield gas flow rate, a back protection gas flow rate, and a welding speed, wherein the welding starting position is $|\alpha|<90°$, the inclination angle of the welding gun is $|\beta|<15°$, the pulse background current is 40~210 A, the peak current is 150~420 A, the smoothing current is 135~420 A, the pulse frequency is 1~100 Hz, the ion gas flow rate is 1~10 L/min, the duty cycle is 10~90%, the protection gas flow rate is 10~35 L/min, the dragging shield gas flow rate is 25~95 L/min, the back protection gas flow rate is 25~85 L/min, and the welding speed is 70~300 mm/min.

8. The method of all-position plasma welding process for titanium alloy pipeline according to claim 6, wherein parameters set for the filling welding and the covering welding comprise a welding starting position, an inclination angle of the welding gun, a filler wire position, a pulse background current, a peak current, a smoothing current, a pulse frequency, a protection gas flow rate, a duty cycle, an ion gas flow rate, a dragging shield gas flow rate, a back protection gas flow rate, a wire feeding speed, a diameter of a welding wire, a swinging amplitude of the welding gun, and a welding speed, wherein the welding starting position is $|\alpha|<90°$, the inclination angle of the welding gun is $|\beta|<15°$, the filler wire position is $45°<|\gamma|<75°$, the pulse background current is 40~110 A, the peak current is 80~420 A, the smoothing current is 135~420 A, the pulse frequency is 1~100 Hz, the protection gas flow rate is 1~25 L/min, the duty cycle is 10~90%, the ion gas flow rate is 1~10 L/min, the dragging shield gas flow rate is 25~95 L/min, the back protection gas flow rate is 10~35 L/min, the wire feeding speed is 0~4000 mm/min, the diameter of the welding wire is 0.8~1.4 mm, the swinging amplitude of the welding gun is −25 mm+25 mm, and the welding speed is 70~300 mm/min.

9. The method of all-position plasma welding process for titanium alloy pipeline according to claim 1, wherein the method of all-position plasma welding process for titanium alloy pipeline further comprises a preliminary experiment, and the preliminary experiment is used to measure a lowest keyhole voltage of a keyhole type plasma arc.

10. A welding system,
wherein the welding systems using the method of all-position plasma welding process for titanium alloy pipeline according to claim 1 to obtain a titanium alloy pipeline product;
the welding system comprises a welding tractor system, a gas protection device, and a clamping device for fixing a pipeline;
the clamping device comprises an annular rack, a fastening structure, and two tracks each in a semi-circular shape, the two tracks are assembled to form an annular shape, the annular rack is mounted to the tracks, the fastening structure is mounted to inner sides of the tracks;
the welding tractor system is mounted to the annular rack, and the welding tractor system rotates along the annular rack;
the gas protection device is fixedly connected to the welding tractor system;
after the pre-welding treatment of grooving is performed to the pipeline to be welded, the pipeline is connected to the welding tractor system through the clamping device; and
the welding tractor system completes the welding according to the preset welding parameters.

11. The welding system according to claim 10, wherein the welding tractor system comprises a trolley, a plasma gun, and a wire feeding mechanism, the trolley is mounted to the annular rack, the trolley is in sliding connection to the annular rack, the trolley moves relative to the annular rack around a shaft axis of the annular rack, the plasma gun and the wire feeding mechanism are respectively mounted to the trolley, the plasma gun and the wire feeding mechanism are provided at an interval, and an output end of the wire feeding mechanism is oriented towards an output end of the plasma gun; and
during the welding tractor system is operating, the trolley is in circular movement along the annular rack, and the plasma gun processes and welds the pipeline located in middle of the annular rack.

12. The welding system according to claim 11, wherein the trolley comprises a base, a gear, and a drive motor, the drive motor is in drive connection to the gear, the gear is mounted to the base, and the gear is engaged with the rack, and the base is mounted in sliding connection to the track.

13. The welding system according to claim 11, wherein the wire feeding mechanism comprises a welding wire reel, a wire feeder, and a wire feeding guide frame, the wire feeding guide frame is mounted to the trolley, the welding wire reel and the wire feeder are respectively mounted to the wire feeding guide frame, and an output end of the wire feeder is oriented towards an output end of the plasma gun; and
the plasma gun and the wire feeder cooperate with each other, to complete a welding action.

14. The welding system according to claim 10, wherein the gas protection device comprises an outer protection device and a back protection device, the outer protection device is fixedly connected to the welding tractor system, the outer protection device is located at an outer side of the pipeline, and the back protection device is located at an inner side of the pipeline; and
the outer protection device protects an outer side face of the pipeline, the back protection device protects the inner side of the pipeline, and the outer protection device and the back protection device, in cooperation, achieve all-round protection for a welding part of the pipeline.

15. The welding system according to claim 14, wherein the outer protection device comprises a first gas hood of a bracket, the bracket is mounted to the welding tractor system, and the first gas hood is mounted to an end of the bracket away from the welding tractor system; the back protection device comprises a guiding mechanism and a second gas hood, the second gas hood is mounted at an output end of the guiding mechanism, the guiding mechanism drives the second gas hood to rotate, a shaft axis of rotation of the second gas hood overlaps the shaft axis of the annular rack, the second gas hood and the first gas hood are provided at an interval, and the pipeline is located between the first gas hood and the second gas hood.

16. The welding system according to claim 15, wherein the first gas hood and the second gas hood are provided corresponding to each other, and an angular velocity of rotation of the guiding mechanism is the same as an angular velocity of rotation of the welding tractor system; and
the first gas hood and the second gas hood move in synchronization, and the welding part of the pipeline is better protected.

17. The welding system according to claim 15, wherein the welding system further comprises a back weld visual system, the back weld visual system comprises a camera assembly, a liquid crystal optical monitor, and a light source; the camera assembly and the light source are respectively mounted to an end of the guiding mechanism close to the second gas hood; and the liquid crystal optical monitor is electrically connected to the camera assembly.

18. The welding system according to claim 10, wherein the clamping structure comprises a plurality of screw rod slide block mechanisms, the plurality of screw rod slide block mechanisms are provided at intervals along a circumferential direction of the track, and axes of the screw rod slide block mechanisms pass through a center of a circle of the track; and
the screw rod and the slide block cooperate with each other, to clamp and fix the pipeline.

19. The welding system according to claim 11, wherein the clamping structure comprises a plurality of screw rod slide block mechanisms, the plurality of screw rod slide block mechanisms are provided at intervals along a circumferential direction of the track, and axes of the screw rod slide block mechanisms pass through a center of a circle of the track; and the screw rod and the slide block cooperate with each other, to clamp and fix the pipeline.

* * * * *